June 15, 1926.
F. MORRIS
1,588,981
ELECTRIC CONTROLLER
Filed June 17, 1924  3 Sheets-Sheet 1
Fig. 1ᵃ
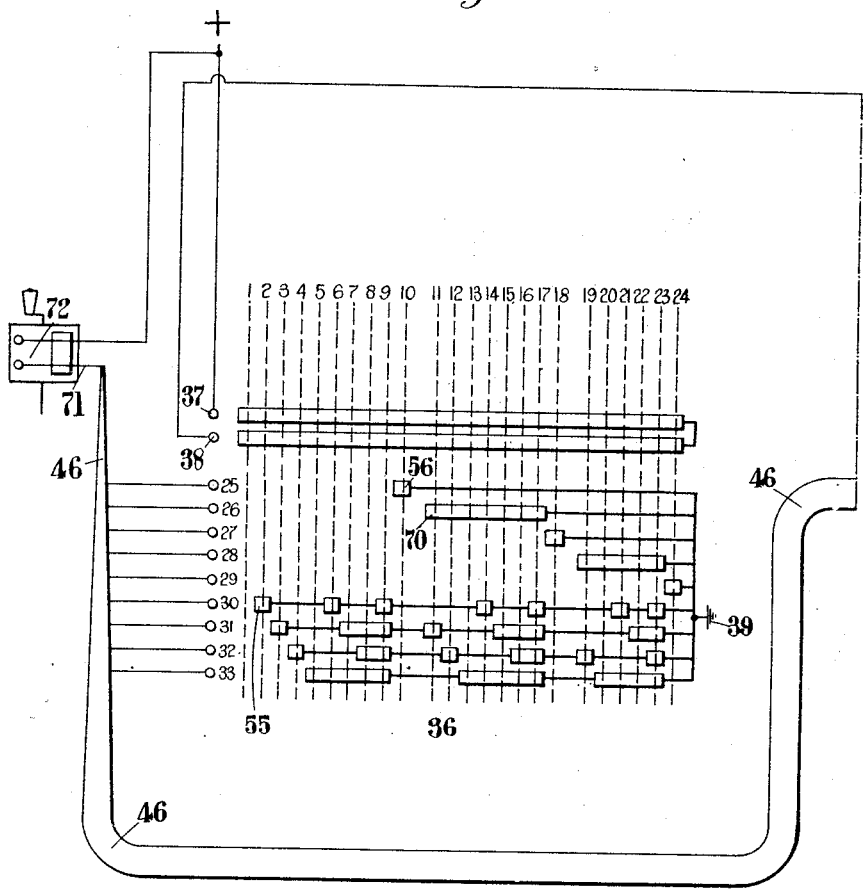

June 15, 1926.
F. MORRIS
1,588,981
ELECTRIC CONTROLLER
Filed June 17, 1924
3 Sheets-Sheet 2
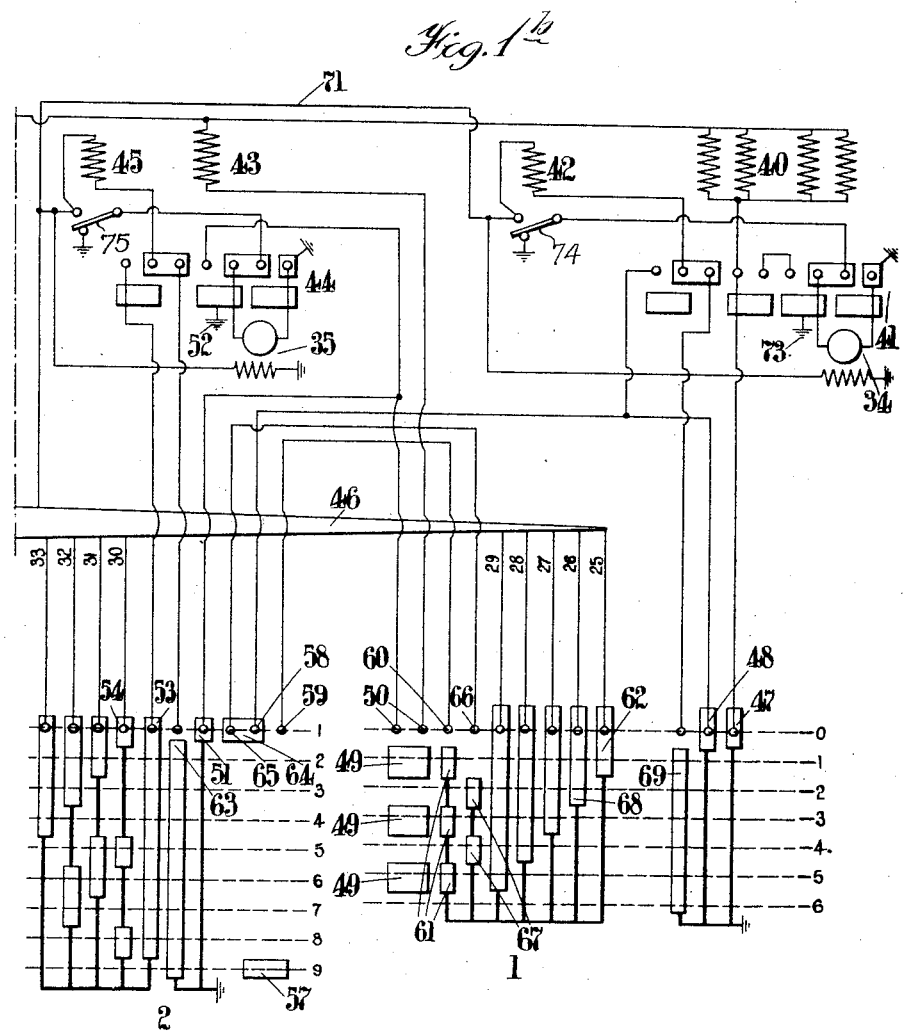

June 15, 1926.

F. MORRIS

ELECTRIC CONTROLLER

Filed June 17, 1924

INVENTOR
Frederick Morris
BY Byrnes, Stebbins
 & Parmelee
his ATTORNEYS

Patented June 15, 1926.

1,588,981

UNITED STATES PATENT OFFICE.

FREDERICK MORRIS, OF LONDON, ENGLAND, ASSIGNOR TO THE ENGLISH ELECTRIC COMPANY, LIMITED, OF LONDON, ENGLAND, A BRITISH COMPANY.

ELECTRIC CONTROLLER.

Application filed June 17, 1924, Serial No. 720,667, and in Great Britain July 4, 1923.

This invention relates to electric motor control systems of the type in which a master switch, by which an auxiliary electric, pneumatic or other type of motor is to be controlled, and a switch or arrangement of switches operated by the auxiliary motor are arranged so that one sets a circuit or circuits in condition to cause the auxiliary motor to move and the other when the said motor or a part driven by it reaches the desired position operates to cancel the setting brought about by the first and so brings the motor to rest.

The invention consists in the use in an arrangement of the above kind of a plurality, for example, two auxiliary motors each arranged to operate a switch or arrangement of switches which are interlocked with one another either mechanically, electrically or by a combination of these two means in such a manner that one switch arrangement executes a whole cycle of operations under the influence of the master switch in the intervals between the execution of the other switch arrangement under the influence of the master switch of only a fractional part of its cycle of operations. In this way there can conveniently be obtained a much larger number of control steps for the apparatus to be controlled such as the main motors of an electric locomotive than would be possible if only one switch arrangement is employed, or two such arrangements not interlocked, because the controlling steps obtainable with one switch arrangement can be used over and over again and each time to produce a different effect upon the apparatus to be controlled.

This invention is intended more particularly for use for controlling the main motors of an electric locomotive when one of the switch arrangements, namely, that one which only executes a fractional part of its complete cycle of operations at a time controls more especially the connections which govern the series-parallel or grouping connections of the main motors and the other switch arrangement governs more especially the cutting in and out of the controlling resistances for the said motors.

The invention will now be described more in detail and by way of example and with reference to the accompanying diagrammatic drawing as applied to a control system of the kind having a master controller and a secondary controller which cooperate together in a manner similar to those parts in British patent specification No. 175,877 to the extent that so long as the secondary controller has not been moved by the auxiliary motor into a position which corresponds to the position of the master controller a connection direct to earth exists from a terminal on the secondary controller through the conducting parts thereof, through certain conductors connecting the two controllers together and through certain conducting parts of the master controller. This connection to earth causes the auxiliary motor to operate the secondary controller.

The invention may be understood by reference to the accompanying drawings, wherein:

Figures 1ª and 1ᵇ are complementary parts of a circuit diagram of the control elements of an electric locomotive and the manner in which they are interconnected;

Figure 2:
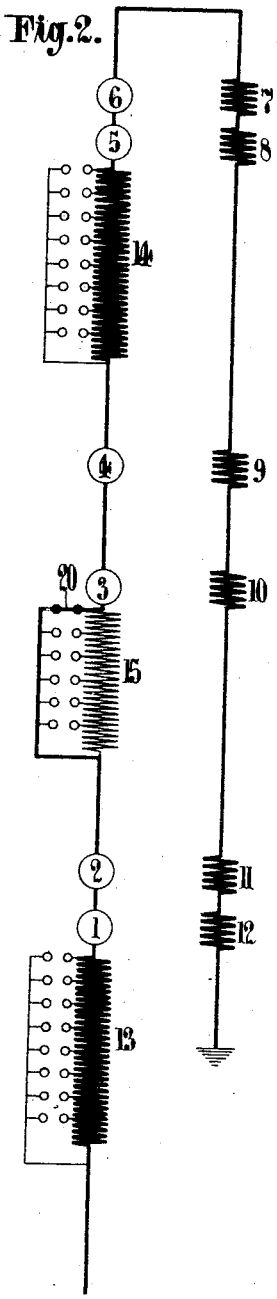
Figure 2 is a diagram of the circuit connections of the six main motors of the locomotive and their associated resistances as they exist when the master controller has been moved from its "off" position to its first position.

Referring to the diagram in Figures 1ª and 1ᵇ it will be assumed that two secondary controllers 1 and 2 are provided each having its own auxiliary motor 34 and 35, and being also provided with other appropriate operating apparatus which will be referred to later. Each secondary controller with its appendant apparatus forms one of the switch arrangements previously referred to. Controller No. 1 principally controls the series parallel or grouping connections of the main motors, (which are six in number but are not shown in the diagram), and controller No. 2 principally controls the switching in and out of the resistances for the said motors. Each controller has mounted upon its shaft or upon an extension shaft thereto a series of cams (not shown in Figures 1ª and 1ᵇ) each of which operates a switch device which is in circuit with the main power conductors and resistances for the main motors.

The two controllers are, in accordance with this invention, interlocked, so that they perform the switching operations for the main motors in appropriate sequence.

The master controller 36 is provided with a rotating drum, moved by the operator, upon the surface of which are fixed, in appropriate positions, a plurality of contact segments. The two uppermost moving segments are joined together and extend through all the twenty four positions of the controller in such a way that they serve to connect electrically together the two fixed contacts 37 and 38 whenever the master controller is moved from its "off" position, in which it is shown in the diagram. All the other moving segments are connected electrically together and to "earth" at 39 and they severally make contact with certain of the fixed contacts according to the position in which the master controller has been placed. These fixed contacts are respectively connected to the control conductors 25 to 33 in a control cable 46.

As soon as the master controller has been moved to any one of its twenty four control positions, one terminal + of a source of current is connected by way of the fixed contacts 37 and 38 to the operating windings 40 of a combined line breaking switch for the main motors and reversing switch 41 for the auxiliary motor 34 and the secondary controller 1 with its cam shaft switches (not shown). In addition the source of current is connected to the operating winding 43 of a reversing switch 44 for the auxiliary motor 35 and the secondary controller 2.

The secondary controller 1 (having one "off" position and six control positions,) has mounted upon a part thereof which is moved by the motor 34 and which may take the form of a rotating drum a plurality of contact segments. Three of these, 47, 48 and 69 on the right hand side are connected directly and electrically together and to "earth". They cooperate with three fixed contacts situated in the diagram opposite the "off" position of this controller and connected electrically to contacts on the switch 41 and on the secondary controller 2, as shown. Five other moving contact segments, connected electrically together, co-operate with fixed contacts connected to the conductors 25 to 29 in the control cable 46 and these moving segments are also electrically connected to two groups of moving segments 61 and 67 which will be presently referred to more in detail and which form part of the interlocking mechanism.

The secondary controller 2 (having nine positions) also has mounted upon a part thereof, which is moved by the motor 35, and which may take the form of a moving drum, a plurality of contact segments. Two of these, 51 and 63, are connected directly and electrically together and to "earth" and they cooperate with two fixed contacts connected to fixed contacts on the reversing switch 44. A group of nine contact segments on the left, all connected together, operates with certain fixed contacts to pass current from a fixed contact on reversing switch 44 to the control conductors 30 to 33 according to the position of controller 2. Other moving contact segments and fixed contacts on controller 2 form part of the interlocking mechanism and will presently be referred to in detail.

The operation of the control system in conjunction with the interlocking mechanism will now be described.

Before operating the master controller 36 it is necessary to connect a source of current on the one hand to one terminal of a coil 42 which performs by means of contactor switch 74 the switching in and out of circuit of the armature of the auxiliary motor 34 and on the other hand to one terminal of the field winding of this motor, which winding therefore becomes energized since the other terminals of both the source of current and the field winding are permanently connected to "earth". It is also necessary to do the same in the case of coil 45 which performs by means of contactor switch 75 the switching in and out of circuit of the armature of the auxiliary motor 35 and also in the case of the field winding for this motor which also in consequence becomes energized. All these connections are made by means of the hand switch 72 which connects the source of current by way of a conductor 71 in the cable 46 to the coils 42 and 45.

Figure 3:
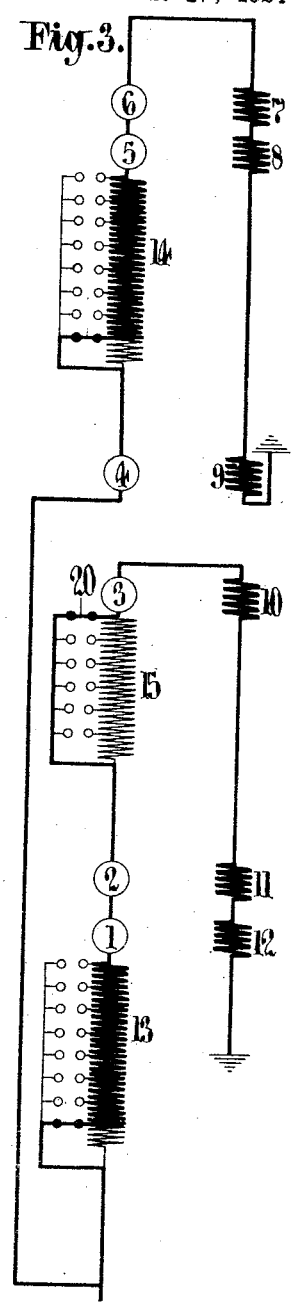
Figures 3 and 4 are similar views, illustrating the circuit wherein the master controller has been advanced respectively to its eleventh and nineteenth positions.
Figure 4:
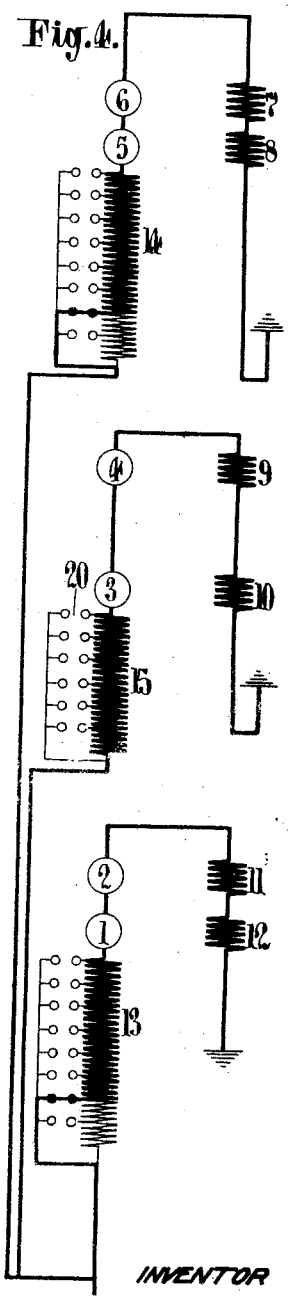

Having operated the switch 72 and with all the other mechanism in the positions shown in the diagram, on moving the master controller 36 to its position 1 the source of control current is brought to the windings 40 and 43. Control current flows through winding 40 to "earth" by way of the moving contact segment 47, and the switch 41 is thereupon moved to the position opposite to that shown in the diagram, where it is retained by earth connection 73 until controller 36 is moved back to its "off" position as in the diagram. With the switch 41 in this position control current can also flow through the coil 42 to "earth" by way of the moving contact segment 48. The contactor switch 74 is thereupon operated to cause the rotation of motor 34 in such a direction as will move secondary controller 1 in a forward direction until segment 48 runs off its co-operating fixed contact, which takes place as soon as controller 1 has reached its position 1 wherein all the six main motors are connected in series and in series with all their controlling resistances. This is shown in Figure 2 where the numerals 1 to 6 denote the six motor armatures and 7 to 12 the respective field windings of these motors. The armatures and field windings are in series with sixteen steps of resistance, eight steps in each of the banks of resistances 13 and 14. A third bank 15 of resistances is short circuited and only comes into operation at position 19 (see Figure 4) of controller 36 when the motors have been connected into three parallel groups. Controller 1 then comes to rest in position 1 and it is to be particularly observed that in this position one of three moving segments 49 situated at alternate control positions of this controller bridges two fixed contacts 50 and enables the winding 43 to become energized by way of this bridging connection and the short earthed moving segment 51 on controller 2. The reversing switch 44 is therefore moved to its position opposite to that in the diagram where it is retained by earth connection 52 as long as the contacts 50 are bridged thus connecting up the armature of motor 35 so that when energized it will drive the controller 2 in its forward direction. This forward motion will take place as soon as controller 36 is moved to position 2 which permits a circuit to be established through the coil 45, moving segments 53 and 54, control conductor 30, and moving segment 55 to "earth". The immediate cause of the forward motion of controller 2 is the closing of the contactor switch 75 and the energizing of the armature of motor 35. The controller 2 will come to rest in its position 2 because by that time the segment 54 will have overrun its co-operating fixed contact which is connected to control conductor 30, but this controller can be caused to move forward through all its 9 steps, one by one, by moving forward the controller 36 step by step to its position 9 whereby the control conductors 30 to 33 are brought into co-operation with the moving and fixed contacts on the controllers 2 and 36 in a manner which is known and which will be clear from an inspection of the diagram. When controller 2 has reached its position 9, seven steps of resistance will have been cut out of circuit from each bank 13 and 14 of resistance, the third bank 15 still remaining short circuited. If now controller 36 is moved from position 9 to position 10 it connects control conductor 25 to "earth" by way of moving segment 56, and the coil 42 again becomes energized by way of the moving segment 57 which bridges the two fixed contacts 58 and 59 and by way of a fixed contact 60 and one of three moving segments 61 (situated at alternate control positions of controller 1 which correspond to the control positions of the segments 49), moving segment 62 and its co-operating fixed contact which is connected to control conductor 25. Controller 1 consequently moves forward another step into its position 2 where the segments 61 and 62 have overrun their co-operating fixed contacts. Immediately this position 2 is reached the moving segment 49 ceases to bridge the fixed contacts 50 and thus causes the winding 43 to become de-energized and to allow the switch 44 to drop by gravity or otherwise into the position shown in the diagram which reverses the motor 35 and also, by establishing a circuit through the winding of contactor device 45 by way of the long moving segment 63 to "earth", energizes the motor 35 which winds the controller 2 right back to its position 1. The effect of these last mentioned motions of controllers 1 and 2 is to cut out the two remaining steps of resistance in the banks 13 and 14 in circuit with the main motors and thus to leave these motors all connected together in series without resistance in circuit. If now controller 36 is moved from its position 10 to 11 it connects control conductor 26 to earth by way of the moving segment 70 and the coil 42 again becomes energized by way of the moving segment 64 which bridges the two fixed contacts 58 and 65 and by way of a fixed contact 66 and one of two moving segments 67 situated at alternate control positions of controller 1 which correspond to control positions intermediate to those control positions corresponding to the segments 49, moving segment 68 and its co-operating fixed contact which is connected to control conductor 26. Controller 1 consequently moves forward another step into its position 3 where the segments 67 and 68 have over-run their co-operating fixed contacts. Immediately this position 3 has been reached one of the moving segments 49 again bridges the fixed contacts 50 thus causing the re-energizing of winding 43 and the movement of controller 2 forward to its control position 3 under the action of control conductor 31 which it will be noticed is also operative in position 11 of controller 36. This last movement of controller 2 is permitted because it is not desired to have all the steps of the resistance in circuit with the main motors when they are first connected up in two parallel circuits each of three motors in series as is the case when controller 1 moves from its position 2 to its position 3. Figure 3 shows the conditions obtaining when the controller 36 has been moved to its position 11.

From the foregoing description it will be quite easy to follow the subsequent control steps with the aid of the diagram. They take place in the following order. From position 12 to 17, inclusive, of controller 36, the controller 2 moves step by step to cut out more resistance. When controller 36 is moved from position 17 to 18 controller 1 moves forward to position 4 under the action of control conductor 27 and, immediately afterwards, owing to the unbridging of contacts 50 by segments 49 the controller 2 moves back to its position 1. In these two positions of the secondary controllers the main motors are connected up in two parallel circuits each of three motors in series without any resistance. When controller 36 is moved from position 18 to 19, controller 1 moves forward from its position 4 to 5 and controller 2 moves forward to position 4. In these two positions the main motors are connected up in three parallel circuits each of two motors in series with resistance, and it will be observed by reference to Figure 4 that the contactor switch 20 which hitherto has short circuited the bank of resistances 15 has now been opened so that each pair of motors is in series with six steps of resistance in the banks 13, 14 and 15. From positions 20 to 23 inclusive of controller 36 the controller 2 is moving forward and cutting out resistance and when position 24 is reached controller 1 moves forward to its position 6 and controller 2 to its position 1 when all the main motors are connected in three parallel circuits without resistance. It will be observed that segment 69 comes into use, when the controller 36 is moved back to the "off" position, to energize the coil 42 so that the controller 1 is moved back to its "off" position.

From the foregoing description it is clear that the particular function of the fixed contacts 50 and of the co-operating moving segments 49 on controller 1, is to permit controller 2 to move forward under the control of the master controller 36 or to prevent this forward motion and simultaneously cause the return of controller 2 to its first controlling position.

It is also clear that the particular functions of the moving segments 61 and 67 on controller 1, 57 and 64 on controller 2 and the co-operating fixed contacts is to ensure that controller 1 cannot be moved a step forward under the control of the master controller 36 so long as controller 2 remains in any of its intermediate controlling positions.

It is to be understood that the above interlocking arrangement has only been described by way of example and that we do not in any way limit our invention to the above described arrangement. Clearly modifications and alterations could be made and would probably be necessary in adapting an interlocking arrangement to other forms of controller of the kind referred to.

What I claim as my invention and desire to secure by Letters Patent is:—

1. An electric control system for motors comprising a master switch, a plurality of motor means controlled by said switch, a multi-step secondary switch operated by each of said motor means and interlocking means determining the sequence of operation of the steps of the said secondary switches.

2. An electric control system for motors comprising a master switch, a plurality of motor means controlled by said switch, a multi-step secondary switch operated by each of said motor means and interlocking means between the said secondary switches for causing one switch to pass through all of its steps repeatedly while another of said switches is passing through its series of steps once.

3. An electric control system for motors comprising a master switch, a plurality of motor means controlled by said switch, a multi-step secondary switch operated by each of said motor means and interlocking means between the said secondary switches for preventing simultaneous movement of two of them.

4. An electric control system for motors comprising a master controller, two motor means controlled by said controller, a secondary controller actuated by each of said motor means one dealing with the grouping of the motor circuits and the other with the adjusting of the value of the resistance therein and interlocking means determining the order of operation of the steps of the two secondary controllers.

5. An electric control system for motors comprising a master controller, two motor means controlled by said controller, a secondary controller actuated by each of said motor means one dealing with the grouping of the motor circuits and the other with the adjusting of the value of the resistance therein and interlocking means for causing the said resistance controller to pass through all of its steps repeatedly while the said grouping controller passes through its steps once.

6. An electric control system for motors comprising a master controller, two electrically controlled motor means, a secondary controller actuated by each of said motor means, electrical connections between the master controller and the secondary controllers and the motor means for causing the secondary controllers to follow the movement of the master controller, interlocking contacts on said secondary controllers and connections between said contacts whereby sequence of operation of the two secondary controllers is determined.

7. An electric control system for motors comprising a master controller, two secondary controllers operating under the influence of said master controller, means associated with one of said secondary controllers for moving it from its initial position through a series of operative positions, means for replacing it in its initial position and interlocking means associated with the other secondary controller for bringing said moving and replacing means into operation alternately, the moving operation corresponding with one set of positions of the other secondary controller and the replacing operation corresponding with other positions of said controller alternating with the first set of positions.

8. An electric control system for motors comprising a master controller, two electrically controlled motor means, a secondary controller actuated by each of said motor means, control circuits for one motor means including contacts on the master controller and on the secondary controller driven by said means and control circuits for the other motor means including contacts on the master controller and on each of the secondary controllers.

9. An electric control system for motors comprising a master controller, two electrically controlled motor means, a secondary controller actuated by each of said motor means, means for selecting the one or the other secondary controller for operation by the actuation of the master controller and interlocking means for preventing movement of the secondary controller which has not been selected during the movement of the selected one.

10. An electric control system for motors comprising a master controller, two electrically controlled motor means, a secondary controller actuated by each of said motor means, means for reversing the direction of movement of one of said motor means and co-acting fixed and moving contacts on the other secondary controller for determining the action of said reversing means so as to set it alternately forwards and backwards for successive positions of the said secondary controller.

11. An electric control system for motors comprising a master switch, a plurality of motor means controlled by said switch, a multi-step secondary switch operated by each of said motor means and interlocking means between the said secondary switches for preventing simultaneous movement of two of them and for causing movement of one switch through all its steps to alternate with the movement of another switch through a part of its steps.

12. An electric control system for motors comprising a master switch, a plurality of motor means controlled by said switch, a multi-step secondary switch operated by each of said motor means and interlocking means between the said secondary switches for preventing simultaneous movement of two of them and for causing movement of one switch through all its steps to alternate with the movement of another switch through a part of its steps, the last mentioned movement being prevented from taking place except when the other secondary switch is in one or other of its two end positions.

In testimony whereof I affix my signature.

FREDERICK MORRIS.